US010393179B2

(12) United States Patent
Charmillot et al.

(10) Patent No.: US 10,393,179 B2
(45) Date of Patent: Aug. 27, 2019

(54) SEGMENTED OUTER RING FOR A BEARING FOR MITIGATING TORQUE DEGRADATION

(71) Applicant: Schaublin SA, Delemont (CH)

(72) Inventors: Philippe Charmillot, Rebeuvelier (CH); Matthias Duenner, Courroux (CH)

(73) Assignee: Schaublin SA, Delémont (CH)

( * ) Notice: Subject to any disclaimer, the term of this patent is extended or adjusted under 35 U.S.C. 154(b) by 4 days.

(21) Appl. No.: 14/871,061

(22) Filed: Sep. 30, 2015

(65) Prior Publication Data

US 2016/0097425 A1 Apr. 7, 2016

Related U.S. Application Data

(60) Provisional application No. 62/058,439, filed on Oct. 1, 2014.

(51) Int. Cl.
*F16C 33/60* (2006.01)
*F16C 35/07* (2006.01)
(Continued)

(52) U.S. Cl.
CPC ............ *F16C 33/60* (2013.01); *F16C 23/084* (2013.01); *F16C 35/02* (2013.01); *F16C 35/077* (2013.01);
(Continued)

(58) Field of Classification Search
CPC ...... F16C 35/07; F16C 35/073; F16C 35/077; F16C 11/06; F16C 2226/60; F16C 23/043;
(Continued)

(56) References Cited

U.S. PATENT DOCUMENTS 2,814,539 A * 11/1957 Borger .................. F16C 35/077 29/509
3,250,555 A 5/1966 Wehner
(Continued)

FOREIGN PATENT DOCUMENTS

CN 101014786 A 8/2007
FR 1007872 A 5/1952
(Continued)

OTHER PUBLICATIONS

Extended European Search Report for EP Patent Application No. 15187930.1-1751, dated Dec. 3, 2015.
(Continued)

*Primary Examiner* — Alan B Waits
(74) *Attorney, Agent, or Firm* — Murtha Cullina LLP

(57) ABSTRACT

An outer ring for a bearing includes an outer sleeve that defines a first exterior surface and a first interior area. The first interior area is defined by a first inner surface. The first inner surface has a first fastener mechanism formed therein. The outer ring includes an inner sleeve that defines a second exterior surface and a second interior area. The second interior area is defined by a second inner surface. The second exterior surface has a second fastener mechanism formed therein. The inner sleeve is removably disposed in the first interior area by selective engagement of the first fastener mechanism with the second fastener mechanism. The outer sleeve surrounds the inner sleeve and extends axially from a first end to a second end thereof. The inner sleeve extends from the first end to the second end of the outer sleeve.

31 Claims, 10 Drawing Sheets

(51) Int. Cl.

| | |
|---|---|
| ***F16C 23/04*** | (2006.01) |
| ***F16C 43/04*** | (2006.01) |
| ***F16C 35/077*** | (2006.01) |
| ***F16C 23/08*** | (2006.01) |
| ***F16C 35/02*** | (2006.01) |

(52) U.S. Cl.
CPC ............ *F16C 43/04* (2013.01); *F16C 23/045* (2013.01); *F16C 2226/12* (2013.01); *F16C 2226/60* (2013.01)

(58) Field of Classification Search
CPC .... F16C 23/045; F16C 33/60; F16C 29/0654; F16C 29/0633; F16C 29/0657; F16C 29/0652; F16C 2226/12; F16C 23/084; F16C 35/02; F16C 43/04
See application file for complete search history.

(56) References Cited

U.S. PATENT DOCUMENTS

| | | | | |
|---|---|---|---|---|
| 3,531,145 | A * | 9/1970 | Hackman | F16C 11/0614 403/260 |
| 3,535,006 | A * | 10/1970 | Hudacko | F16C 11/0614 384/206 |
| 3,947,075 | A * | 3/1976 | Ewertz | B25J 1/10 384/210 |
| 4,055,369 | A * | 10/1977 | Lynn | F16C 11/0614 277/361 |
| 4,076,343 | A | 2/1978 | McCloskey | |
| 4,240,677 | A | 12/1980 | Payne et al. | |
| 4,587,833 | A * | 5/1986 | Speakman | B23P 11/00 72/466.8 |
| 4,704,043 | A * | 11/1987 | Hackman | F16C 11/06 403/143 |
| 4,772,139 | A * | 9/1988 | Bretton | F16C 27/04 384/535 |
| 5,463,811 | A * | 11/1995 | Aureli | F16C 11/0614 29/505 |
| 5,839,845 | A * | 11/1998 | Kincaid | F16C 11/0628 29/437 |
| 6,666,583 | B2 * | 12/2003 | Nieman | F16C 35/067 384/537 |
| 7,803,079 | B2 * | 9/2010 | Sakamoto | F16D 9/06 29/893.1 |
| 8,333,792 | B2 | 12/2012 | Winslow et al. | |
| 8,899,916 | B2 | 12/2014 | McCune et al. | |
| 8,967,868 | B2 | 3/2015 | Wright | |
| 9,366,296 | B2 * | 6/2016 | Abrudan | B23P 15/003 |
| 2002/0095790 | A1 * | 7/2002 | Sasaki | F16C 23/045 29/898.06 |
| 2005/0146206 | A1 * | 7/2005 | Moreau | F16C 3/02 301/124.1 |
| 2008/0025655 | A1 * | 1/2008 | Creviston | F16C 19/52 384/45 |
| 2009/0245935 | A1 | 10/2009 | Kamikawa et al. | |
| 2012/0170971 | A1 * | 7/2012 | Pina Lopez | F16C 11/0614 403/122 |
| 2012/0295753 | A1 | 11/2012 | Kwon | |
| 2013/0043719 | A1 | 2/2013 | Wietharn et al. | |
| 2013/0160604 | A1 * | 6/2013 | McNeil | F16C 23/045 74/594 |
| 2013/0315665 | A1 | 11/2013 | Heston et al. | |
| 2014/0010486 | A1 * | 1/2014 | Brewer | F16C 17/12 384/428 |

FOREIGN PATENT DOCUMENTS

| | | | |
|---|---|---|---|
| JP | 2006329368 | A | 12/2006 |
| WO | 2004111478 | A1 | 12/2004 |
| WO | 2006014199 | A1 | 2/2006 |
| WO | 2013143582 | A1 | 10/2013 |
| WO | 2014126521 | A1 | 8/2014 |

OTHER PUBLICATIONS

Chinese Office Action for corresponding CN2015106459612 dated Jun. 16, 2017.

* cited by examiner

SEGMENTED OUTER RING FOR A BEARING FOR MITIGATING TORQUE DEGRADATION

CROSS REFERENCE TO RELATED APPLICATIONS

This patent application claims the benefit of U.S. Provisional Patent Application Ser. No. 62/058,439, filed on Oct. 1, 2014, which is hereby incorporated by reference in its entirety.

FIELD OF THE INVENTION

The present invention relates generally to an outer ring for a bearing, and more specifically to a segmented outer ring for a bearing that includes an outer sleeve and an inner sleeve.

BACKGROUND OF THE INVENTION

Bearings can be used to reduce friction between moving parts of a mechanical assembly. Typically, bearings include an inner member disposed at least partially in an outer ring. The bearing can be secured in a bore of a housing portion of the mechanical assembly. The outer ring can be press fit into the bore of the housing. However, simply press fitting the outer ring of the bearing into the bore of a housing, for certain bearings, can cause an undesirable change in torque on the bearing. This undesirable torque results in decreased functionality of the bearing even though the bearing has no external load. An outer ring of a bearing that, upon being press fit into the bore of the housing portion of the mechanical assembly, remains within a predetermined range of torque throughout and after being press fit into the bore, has long been sought in the art.

SUMMARY OF THE INVENTION

There is disclosed herein an outer ring for a bearing. The outer ring includes an outer sleeve that defines a first exterior surface and a first interior area. The first interior area is defined by a first inner surface extending along the outer sleeve. The first inner surface has a first fastener mechanism formed therein. The outer ring further includes an inner sleeve that defines both a second exterior surface and a second interior area. The second interior area is defined by a second inner surface that extends along the inner sleeve. The second exterior surface has a second fastener mechanism formed therein. The inner sleeve is removably disposed in the first interior area via selective engagement of the first fastener mechanism with the second fastener mechanism. The outer sleeve surrounds the inner sleeve. The outer sleeve extends axially from a first end to a second end of the outer sleeve. The inner sleeve extends axially from the first end to the second end of the outer sleeve.

There is further disclosed herein a bearing assembly that includes an outer ring and an inner member (e.g., an inner race, a shaft, a pin or another sliding or rolling member). The outer ring includes an outer sleeve and an inner sleeve. The outer sleeve defines a first exterior surface and a first interior area. The first interior area is defined by a first inner surface that extends along the outer sleeve. The first inner surface has a fastener mechanism formed therein. The inner sleeve defines a second exterior surface and a second interior area. The second interior area is defined by a second inner surface that extends along the inner sleeve. A second fastener mechanism is formed in the second exterior surface. The inner sleeve is removably disposed in the first interior area via selective engagement of the first fastener mechanism with the second fastener mechanism. The outer sleeve surrounds the inner sleeve. The outer sleeve extends axially from a first end to a second end of the outer sleeve. The inner sleeve extends axially from the first end to the second end of the outer sleeve. The inner member has a third exterior surface. The inner member is at least partially disposed in the second interior area of the inner sleeve for relative rotation therebetween. The relative rotation is caused by an operating torque applied to the inner member and/or the outer ring that remains within a predetermined range throughout and after the selective engagement of the first fastener mechanism with the second fastener mechanism.

In one embodiment, the predetermined range of operating torque of the bearing assembly is dependent upon bearing size. The operating torque being of a finite quantity before installation and being of said finite quantity after installation.

In one embodiment of the bearing assembly, the first engagement mechanism includes a female threaded area and the second engagement mechanism includes a male threaded area which is selectively threaded engaged with the female threaded area.

In one embodiment of the bearing assembly, the first exterior surface is cylindrical and configured to be press fit into a bore of a housing.

In one embodiment of the bearing assembly, the outer sleeve defines one or more locking mechanisms for preventing rotation of the outer sleeve relative to the inner sleeve when the inner sleeve is disposed in the in the first interior area.

In one embodiment of the bearing assembly, one or more of the locking mechanisms includes one or more staking groove formed in at least one axial end of the outer sleeve, the staking grooves define at least one axially extending leg.

In one embodiment of the bearing assembly, the inner sleeve defines at least one chamfer for receiving one of the at least one axially extending legs.

In one embodiment of the bearing assembly, the outer sleeve is manufactured from a first metallic material and the inner sleeve is manufactured from a second metallic material different than the first metallic material. The first metallic material and the second metallic material are selected to inhibit galvanic corrosion.

In one embodiment of the bearing assembly, the outer sleeve and the inner sleeve are metallic materials, non-metallic materials, composite materials, coated materials, uncoated materials, plastics, materials having treated surfaces materials having untreated surfaces and/or materials having other treatments.

In one embodiment of the bearing assembly, the bearing is a spherical bearing, a journal bearing or a roller bearing.

In one embodiment of the bearing assembly, the inner member is one of an inner race, a ball, a shaft, a pin and another sliding or rolling member.

There is further disclosed herein a bearing and housing assembly. The bearing and housing assembly includes a housing and a bearing. The housing has a bore that extends therethrough. The bore is defined by a fourth inner surface of the housing. The bearing includes an inner member and an outer ring. The outer ring includes an outer sleeve and an inner sleeve. The outer sleeve defines a first exterior surface and a first interior area. The first interior area is defined by a first inner surface that extends along the outer sleeve. The first inner surface has a fastener mechanism formed therein.

The inner sleeve defines a second exterior surface and a second interior area. The second interior area is defined by a second inner surface that extends along the inner sleeve. The second exterior surface has a second fastener mechanism formed therein. The inner sleeve is removably disposed in the first interior area by selective engagement of the first fastener mechanism with the second fastener mechanism. The outer sleeve surrounds the inner sleeve. The outer sleeve extends axially from a first end to a second end of the outer sleeve. The inner sleeve extends axially from the first end to the second end of the outer sleeve. The inner member has a third exterior surface. The inner member is at least partially disposed in the second interior area of the inner sleeve for relative rotation therebetween. The relative rotation is caused by an operating torque applied to the inner member and/or the outer ring that remains within a predetermined range throughout and after the selective engagement of the first fastener mechanism with the second fastener mechanism.

In one embodiment of the bearing and housing assembly, the first engagement mechanism comprises a female threaded area and the second engagement mechanism comprises a male threaded area which is selectively threaded engaged with the female threaded area.

In one embodiment of the bearing and housing assembly, the torque range maintains within a predetermined range after the bearing is press fit into the bore of the housing.

In one embodiment of the bearing and housing assembly, the first exterior surface is cylindrical and configured to be press fit into the bore of the housing.

In one embodiment of the bearing and housing assembly, the outer sleeve defines at least one locking mechanism for preventing rotation of the outer sleeve relative to at least one of the inner sleeve and the housing.

In one embodiment of the bearing and housing assembly, the at least one locking mechanism comprises at least one staking groove formed in at least one axial end of the outer sleeve, the at least one staking groove defining at least one axially extending leg.

In one embodiment of the bearing and housing assembly, at least one of the inner sleeve and the housing defines at least one chamfer for receiving one of the at least one axially extending legs.

In one embodiment of the bearing and housing assembly, the outer sleeve is manufactured from a first metallic material and the inner sleeve is manufactured from a second metallic material different than the first metallic material. The first metallic material and the second metallic material are selected to inhibit galvanic corrosion.

In one embodiment of the bearing and housing assembly, the inner outer sleeve and the inner sleeve are at least one of metallic materials, non-metallic materials, composite materials, coated materials, coated materials, plastics, materials having treated surfaces and materials having untreated surfaces.

In one embodiment of the bearing and housing assembly, the operating torque is maintained within a predetermined range after the press fitting of the outer sleeve in the bore.

In one embodiment of the bearing and housing assembly, the first exterior surface of the outer sleeve has a first diameter that is selectively determined for achieving the press fit.

In one embodiment of the bearing and housing assembly, the bearing is a spherical bearing, a roller bearing or a journal bearing.

In one embodiment of the bearing and housing assembly, the inner member is an inner race, a ball, a shaft, a pin or another sliding or rolling member.

There is also disclosed herein a method for assembling a bearing within a housing. The method includes providing the housing that has a bore extending therethrough. The bore is defined by a fourth inner surface of the housing. The method further includes providing the bearing. The bearing includes the outer ring that has the outer sleeve, which defines the first exterior surface and the first interior area. The first interior area is defined by the first inner surface that extends through the outer sleeve. The first inner surface has the first fastener mechanism formed therein. The outer ring further includes the inner sleeve that defines the second exterior surface and the second interior area. The second interior area is defined by the second inner surface extending along the inner sleeve. The second exterior surface has the second fastener mechanism formed therein. The outer sleeve surrounds the inner sleeve. The outer sleeve extends axially from a first end to a second end of the outer sleeve. The inner sleeve extends axially from the first end to the second end of the outer sleeve. The bearing further includes an inner member that has a third exterior surface. The inner member is moveably disposed in the second interior area for relative motion between the inner member and the outer ring. The relative motion is caused by an operating torque applied to the inner member and/or the outer ring.

The method further includes press fitting the outer sleeve in the bore of the housing and removably disposing the inner sleeve in the first interior area. The inner sleeve is removably disposed in the first interior area by selectively engaging the second fastener mechanism with the first fastener mechanism so that the outer sleeve surrounds the inner sleeve and the outer sleeve extends axially from a first end to a second end thereof and the inner sleeve extends axially from the first end to the second end of the outer sleeve and such that the operating torque is maintained within a predetermined range throughout and after the selective engagement of the first fastener mechanism with the second fastener mechanism.

There is also disclosed herein a bearing and housing assembly that includes a housing having a bore extending therethrough. The bore is defined by a housing inner surface. The housing inner surface has a first fastener mechanism formed therein. The bearing and housing assembly includes a bearing disposed at least partially in the bore. The bearing includes an outer ring defining a first exterior surface and a first interior area. The first interior area is defined by a first inner surface extending along the outer sleeve. The first exterior surface has a second fastener mechanism formed therein; and the outer ring is removably disposed in the housing by selective engagement of the first fastener mechanism with the second fastener mechanism. The bearing includes an inner member having a second exterior surface. The inner member is disposed in the second interior area of the inner sleeve for relative rotation therebetween. The relative rotation being caused by an operating torque that is maintained within a predetermined range after the selective engagement of the first fastener mechanism with the second fastener mechanism.

DETAILED DESCRIPTION

Figure 9:
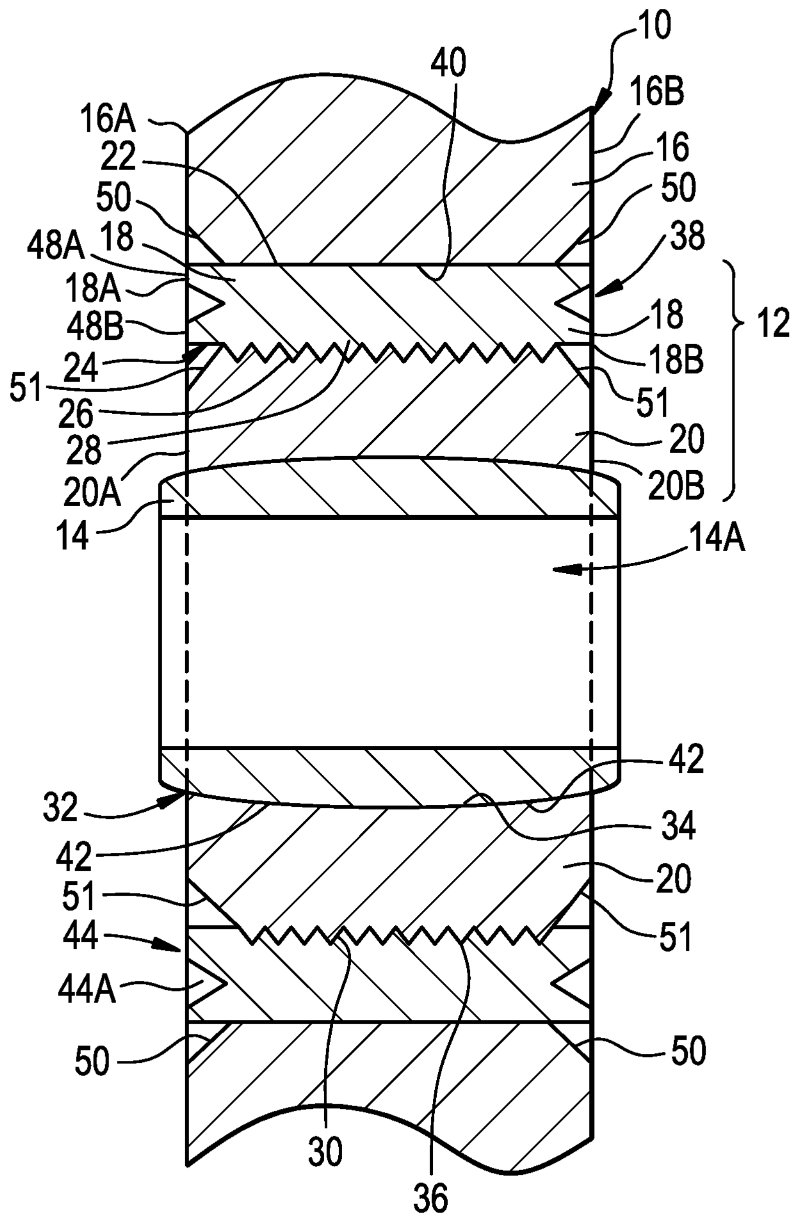
FIG. 9 is a longitudinal cross sectional view of a spherical bearing assembly with no lubricant and having a V-groove, shown before staking.

As shown in FIGS. 1-4, a bearing assembly is generally designated by the numeral 10. The bearing assembly illustrated in FIGS. 1-4 is a lubricated spherical bearing 10 and includes an inner member 14 (e.g., an inner race, a ball, a shaft, a pin or another sliding or rolling member) partially disposed in an outer ring 12, for example, a two piece outer ring (e.g., segmented), as described herein. The outer ring 12 and the inner member 14 are positioned in a housing 16. The outer ring 12 includes an outer sleeve 18 removably positioned around (e.g., surrounds) an inner sleeve 20. The inner member 14 defines a bore 14A extending therethrough. In the embodiment shown in FIGS. 1-4 a lubricant 15 (e.g., a Polytetrafluoroethylene (PTFE) self-lubricating liner, or grease) is positioned between the inner member 14 and the outer ring 12. However, the present invention is not limited in this regard, as other embodiments may not employ a lubricant, for example as shown and described herein with reference to FIGS. 9 and 13.

The outer sleeve 18 defines a first exterior surface 22 and a first interior area 24. The first interior area 24 is defined by a first inner surface 26 that extends along the outer sleeve 18 from first axial end 18A to a second axial end 18B of the outer sleeve 18. The first exterior surface 22 extends from the first axial end 18A to the second axial end 18B. A first fastener mechanism 28 (e.g., a female thread) is formed in the first inner surface 26. The inner sleeve 20 defines a second exterior surface 30 that extends from a third axial end 20A to a fourth axial end 20B of the inner sleeve 20. A second interior area 32 defines a second inner surface 34 (e.g., a concave spherical surface) that extends along (e.g., extends through) the inner sleeve 20 from the third axial end 20A to the fourth axial end 20B. The inner sleeve 20 extends from the first end 18A to the second end 18B of the outer sleeve 18 so that the first end 18A and the third end 20A are coplanar and the second end 18B and the fourth end 20B are coplanar.

A second fastener mechanism 36 (e.g., a male thread) is formed in the second exterior surface 30. The inner sleeve 20 is removably disposed in the first interior area 24 via selective engagement of the first fastener mechanism 28 (e.g., a female thread) with the second fastener mechanism 36 (e.g., a male thread). In one embodiment, as shown in FIGS. 1-4, the first fastener mechanism 28 is a female threaded area and the second fastener mechanism 36 is a male threaded area. The male threaded area 36 is selectively engaged with the female threaded area 28. The female threaded area of the first fastener mechanism 28 and the male threaded area of the second fastener mechanism 36 have a predetermined clearance (e.g., thread tolerance) to allow the outer sleeve 18 to be press fit in the bore 38 without excessive radially inward distortion that would affect or change the operating torque of the bearing assembly 10.

In one embodiment, the operating torque of the bearing assembly 10 is equal to the operating torque after press fitting of the bearing 10 into the bore 38 of the housing 16. In one embodiment, the operating torque of the bearing assembly 10 is within 1% of the operating torque after press fitting of the bearing 10 into the bore 38 of the housing 16. In one embodiment, the operating torque of the bearing assembly 10 is within 5% of the operating torque after press fitting of the bearing 10 into the bore 38 of the housing 16. In one embodiment, a coarse thread using a tap drill size of 85% (±2%) of a major diameter of the female thread may be employed. In one embodiment, a fine thread may be employed using a tap drill size of 90% (±2%) of a major diameter of the female thread. In one embodiment the thread clearance/thread design is per MIL-S-8879, or any other standard, or nonstandard thread design.

Referring to FIGS. 1-4, the second inner surface 34 defines a bearing surface for rotatable communication with a third exterior surface 42 (e.g., a spherical surface) of the inner member 14. The inner member 14 is positioned (e.g., swaged) in the first interior area 24 of the outer ring 12 for relative rotation between the inner member 14 and the first interior area 24 of the outer ring 12. The relative rotation is caused by an operating torque applied to the inner member and/or the outer ring 12 that remains within a predetermined range throughout and after the selective engagement of the first fastener mechanism 28 with the second fastener mechanism 36 and after press fitting the outer sleeve 18 into the bore 38 of the housing 16. In one embodiment, the predetermined range of torque is ±5 percent of a normal operating torque. In one embodiment, the predetermined range of torque is 1-5 percent of a normal operating torque. In one embodiment, the predetermined range of torque is 1-10 percent of a normal operating torque. The percentage of the normal operating torque fluctuates based upon the size of the bearing.

Figure 6:
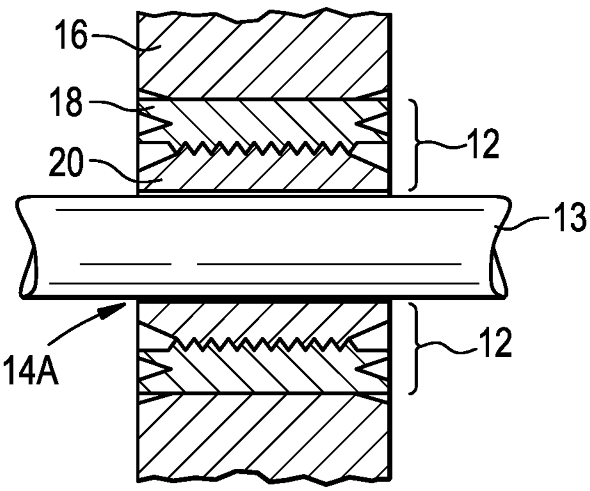
FIG. 6 is a longitudinal cross sectional view of a journal bearing assembly with an outer ring having an outer sleeve positioned around an inner sleeve and having a V-groove in the outer sleeve, shown before staking.
Figure 7:
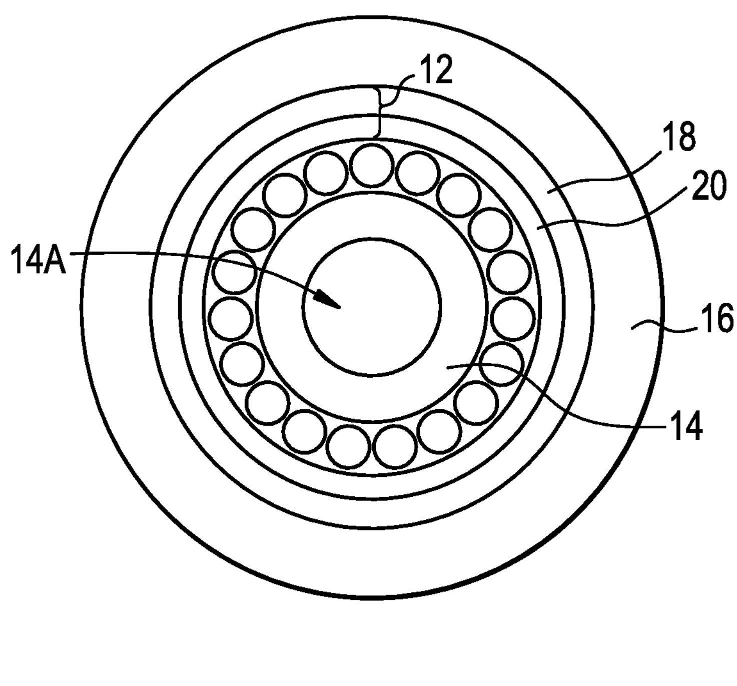
FIG. 7 is a traverse cross sectional view of a roller bearing assembly with an outer ring having an outer sleeve positioned around an inner sleeve and having a V-groove in the outer sleeve, shown before staking.
Figure 8:
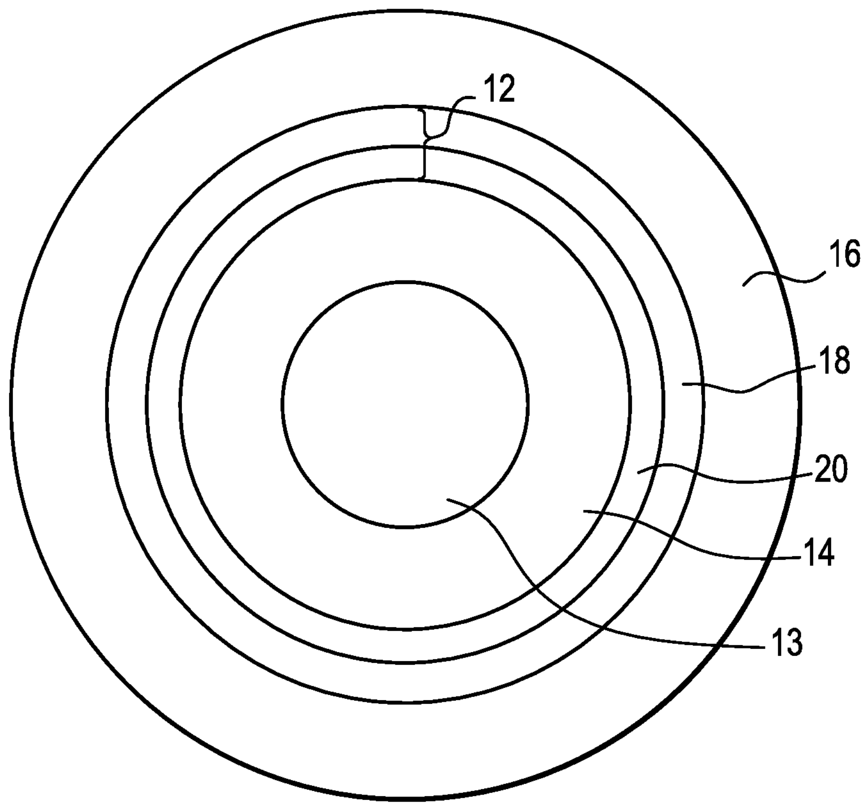
FIG. 8 is a traverse cross sectional view of a two piece sleeve press fit in a bore of a housing and around a shaft.

Although the outer ring 12 having the outer sleeve 18 removably positioned around the inner sleeve 20 is shown and described herein with regard to the lined spherical bearing assembly 10 shown in FIGS. 1-4, the present invention is not limited in this regard, as any suitable type of bearing may be employed, including but not limited to journal bearings rotatably supporting a shaft 13 (see FIG. 6), roller bearings (see FIG. 7), spherical bearings without a lubricant (see FIG. 9), without departing from the broader aspects of the present invention. In addition, while the outer ring 12 having the outer sleeve 18 removably positioned around the inner sleeve 20 is shown and described herein with regard to the lined spherical bearing assembly 10 shown in FIGS. 1-4, the present invention is not limited in this regard, as the outer ring 12 may be adapted for use as a two piece sleeve having the outer sleeve 18 removably positioned around the inner sleeve 20 and may be employed as a two piece spacer or a sleeve, for example positioned or press fit around a shaft 13 and/or press fit in a bore of a housing 16 (see FIG. 8).

Referring to FIGS. 1-4, in one embodiment, the first fastener mechanism 28 is a female threaded area and the second fastener mechanism 36 is a male threaded area that selectively engages the female threaded area 28. The housing 16 defines a bore 38 that extends therethrough. The bore 38 defines a fourth interior surface 40. In one embodiment, the first exterior surface 22 is cylindrical and configured to be press fit into the bore 38 (e.g., a cylindrical bore) of the housing 16 such that the first exterior surface 22 of the inner sleeve 20 is in contact with the fourth interior surface 40. The diameter of first exterior surface 22 of the outer sleeve 20 is selectively determined based upon size of the bore 38 for achieving the press fit. Although the first exterior surface 22 is shown and described as cylindrical, the present invention is not limited in this regard, as any suitable shape of the first exterior surface 22 may be employed.

Figure 1:
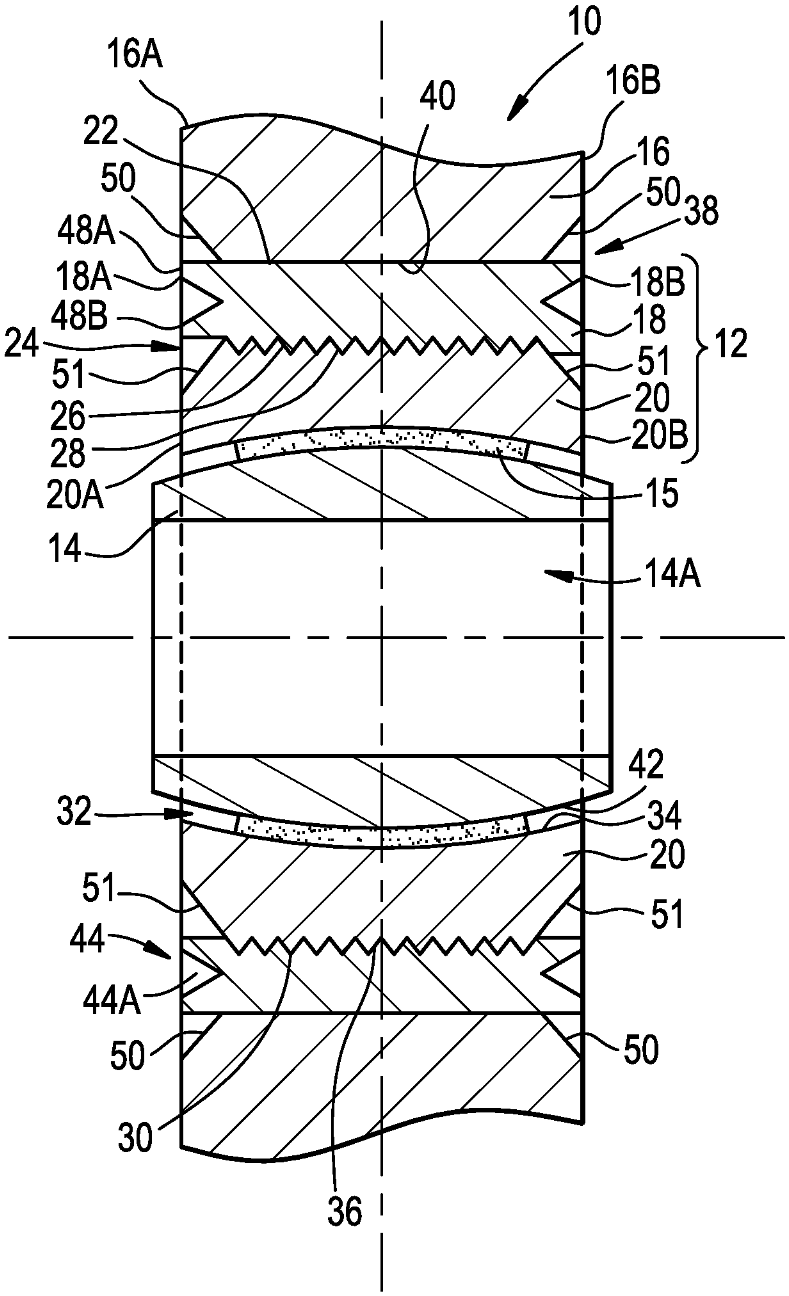
FIG. 1 is a longitudinal cross sectional view of a lined spherical bearing assembly of the present invention having a V-groove, shown before staking.
Figure 2:
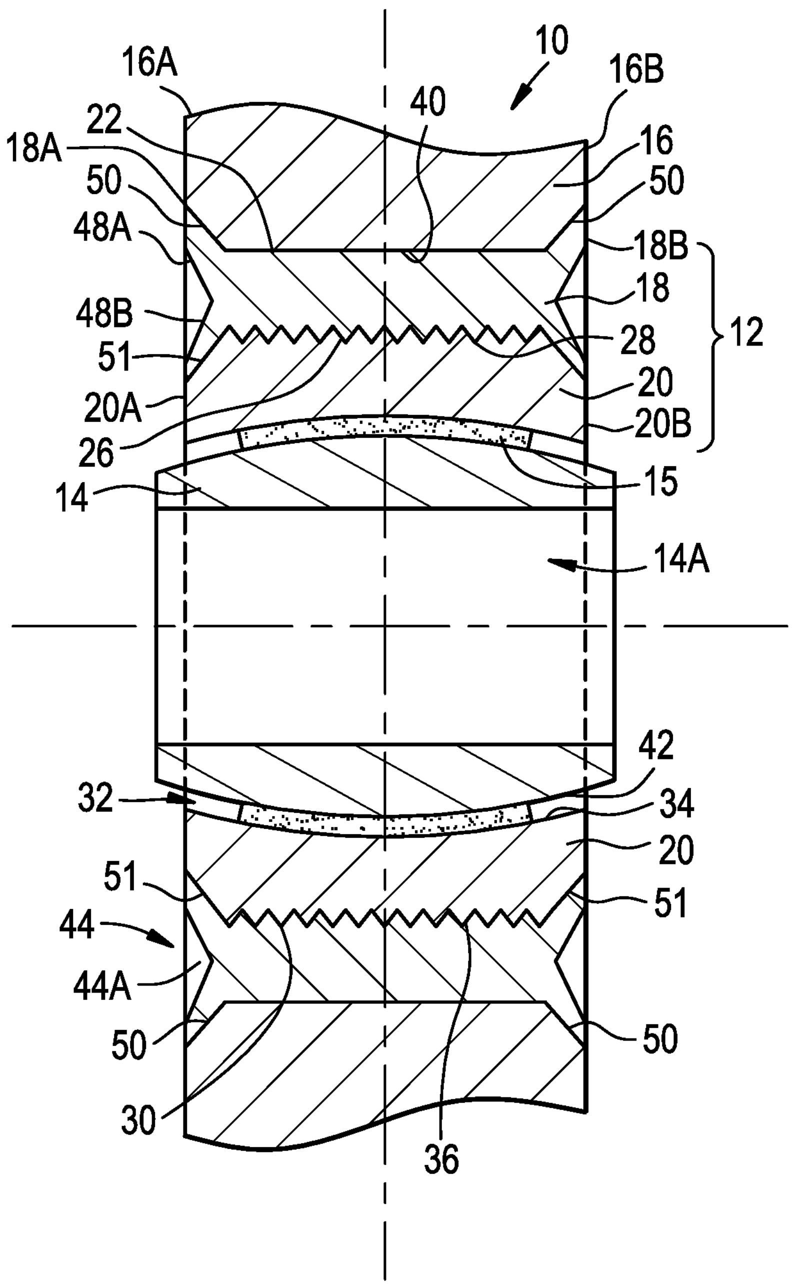
FIG. 2 is a longitudinal cross sectional view of the lined spherical bearing assembly of FIG. 1 shown after staking.
Figure 3:
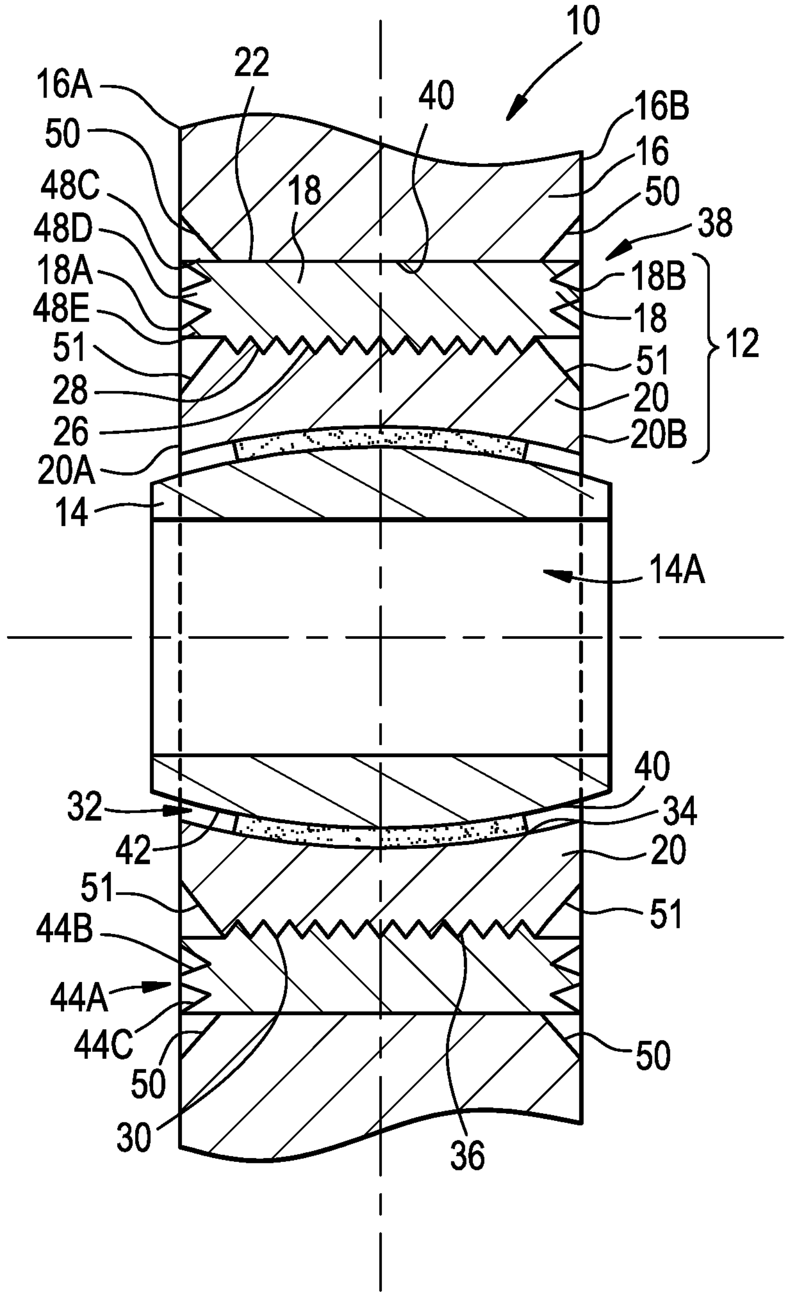
FIG. 3 is a longitudinal cross sectional view of the lined spherical bearing assembly of the present invention having a W-groove, shown before staking.
Figure 4:
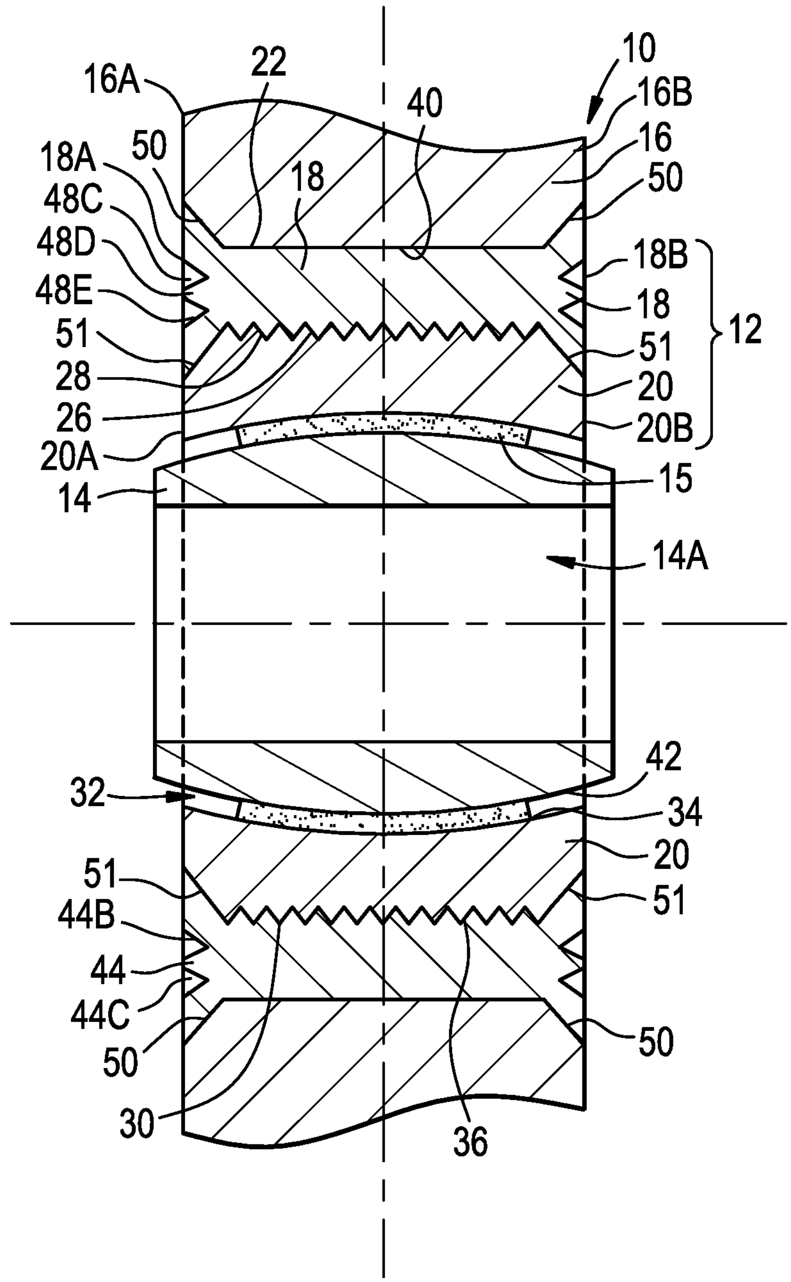
FIG. 4 is a longitudinal cross sectional view of the lined spherical bearing assembly of FIG. 3 shown after staking.
Figure 11:
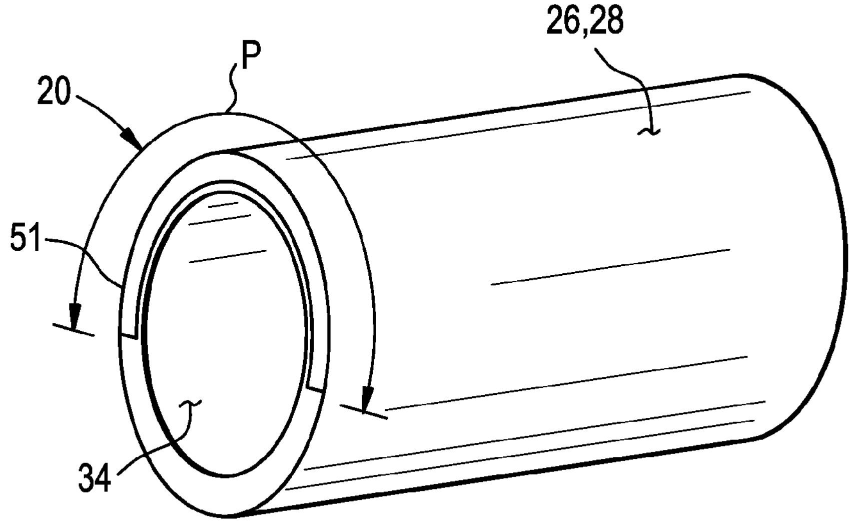
FIG. 11 is a perspective view of the spherical bearing assembly of the present invention, wherein a chamfer extends partially around the inner sleeve.

In one embodiment, as shown in FIGS. 1-4, the outer sleeve 18 includes a locking mechanism 44 that prevents rotation and axial movement of the outer sleeve 18 relative to the inner sleeve 20 when the inner sleeve 20 is disposed in the first interior area 24. The locking mechanism 44 also secures the outer ring 12 relative to the housing 16. In one embodiment, as shown in FIGS. 1 and 2, the locking mechanism 44 includes one staking groove 44A formed in each of the axial ends 18A and 18B of the outer sleeve 18. In one embodiment, as shown in FIGS. 1 and 2, the staking groove 44A is defined by two axially extending legs 48A and 48B. In one embodiment, as shown in FIGS. 1-4, the inner sleeve 20 defines a chamfer 51 extending circumferentially around each of the two opposing axial ends of the inner sleeve 20. The chamfers 51 extend radially outward and axially inward from each of the axial ends 20A and 20B of the inner sleeve 20. The chamfers 51 are configured to receive the axially extending leg 48A. A chamfer 50 extends circumferentially around each of the two opposing axial ends 16A and 16B of the housing 16. The chamfers 50 extend radially and axially inward from each of the ends 16A and 16B of the housing 16. The chamfers 50 are configured to receive the axially extending leg 48A. In an alternative embodiment, as shown in FIGS. 3 and 4, the chamfers 50 are configured to receive the axially extending legs 48C. Although the chamfers 51 extend completely around the inner sleeve 20 in the described embodiment, the present invention is not limited in this regard as the chamfers 51 may extend partially around the inner sleeve 20, as indicated by the arrow P and as shown in FIG. 11. Similar to that shown in FIG. 11 for the chamfers 51, the chamfers 50 may extend partially around the housing 16.

Figure 12:
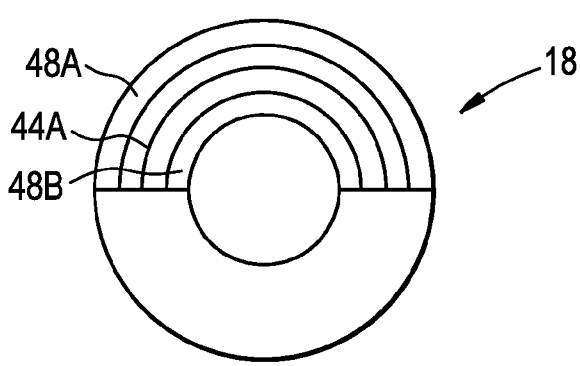
FIG. 12 is a front cross section of the spherical bearing assembly of the present invention, wherein an axially extending leg extends partially around the outer sleeve.

As shown in FIG. 2, the leg 48A is plastically deformed (e.g., staked) into the chamfer 50. In an alternative embodiment, as shown in FIGS. 3 and 4, the locking mechanism 44 includes two staking grooves 44B and 44C. In this embodiment, the locking mechanism 44 further includes three axially extending legs 48C, 48D and 48E. As shown in FIG. 4, the leg 48C is plastically deformed (e.g., staked) into the chamfer 50. Although configurations (1) containing one staking groove 44A and two axially extending legs 48A and 48B; and (2) containing two staking grooves 44B and 44C and three axially extending legs 48C, 48D and 48E are shown and described, the present invention is not limited in this regard, as one skilled in the relevant art could reasonably deduce from the disclosures herein that any suitable number of axially extending legs 48A, 48B, 48C, 48D and 48E and any suitable number of staking grooves 44A, 44B and 44C can be employed to the same effect. Although the axially extending legs 48A, 48B, 48C, 48D and 48E are described as extending completely around the outer sleeve 18, the present invention is not limited in this regard, as the axially extending legs 48A, 48B, 48C, 48D and 48E may extend partially around the outer sleeve 18, as shown in FIG. 12.

Figure 5:
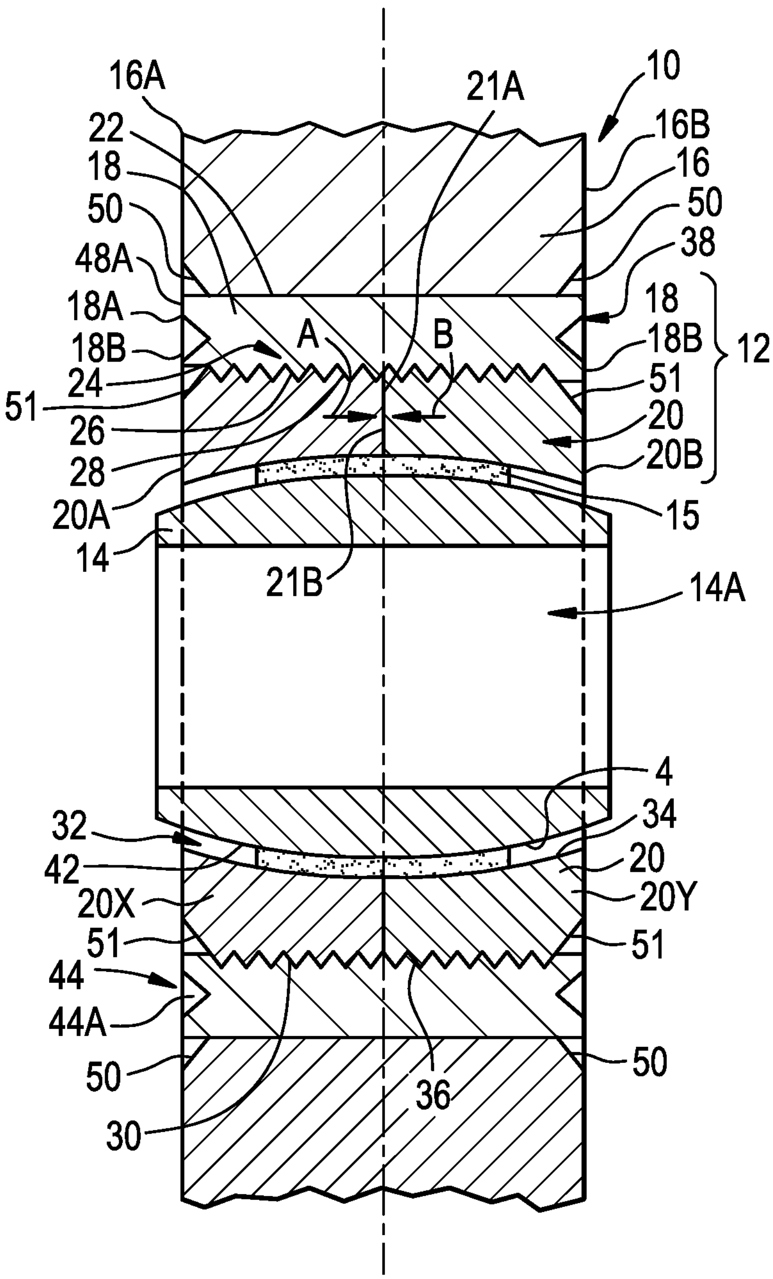
FIG. 5 is a longitudinal cross sectional view of a lined spherical bearing assembly with an outer ring having an outer sleeve positioned around a circumferentially split two-piece inner sleeve and having a V-groove in the outer sleeve, shown before staking.
Figure 10:
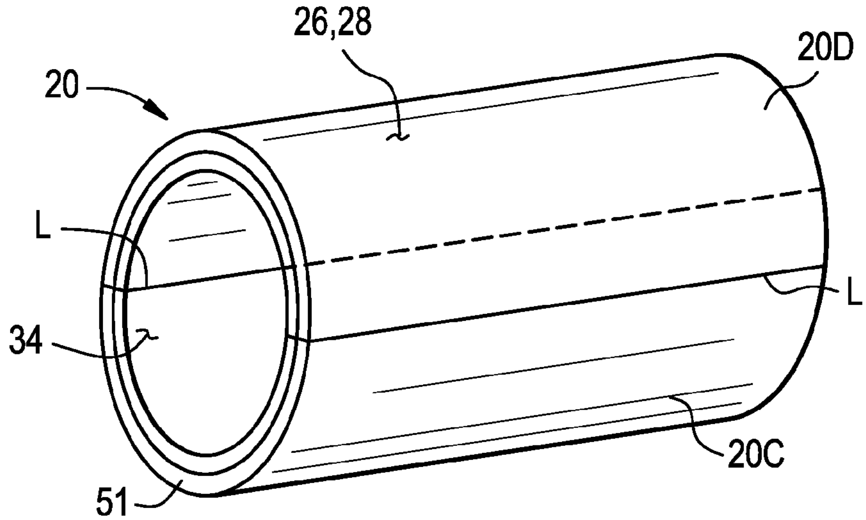
FIG. 10 is a perspective view of the spherical bearing assembly of the present invention, wherein the inner sleeve is split longitudinally.

In one embodiment, as shown in FIG. 5, the inner sleeve 20 is split (e.g., segmented) circumferentially. The split divides the inner sleeve 20 into a first section 20X and a second section 20Y. The first section 20X is screwed into the outer sleeve 18 in a direction indicated by the arrow A. The second section 20Y is screwed into the outer sleeve 18 in a direction indicated by the arrow B. In this embodiment, when the first section 20X is in suitable communication with the second section 20B, a first axial surface 21A defined by an axial end of the first section 20X is flush with a second axial surface 21B defined by an axial end of the second section 20Y. Although in this embodiment, the inner sleeve 20 is split circumferentially into two sections, the present invention is not limited in this regard, as the inner sleeve 20 may be split (e.g., segmented) into any number of sections and in any suitable manner, such as longitudinally split along plane L, as shown in FIG. 10.

Figure 13:
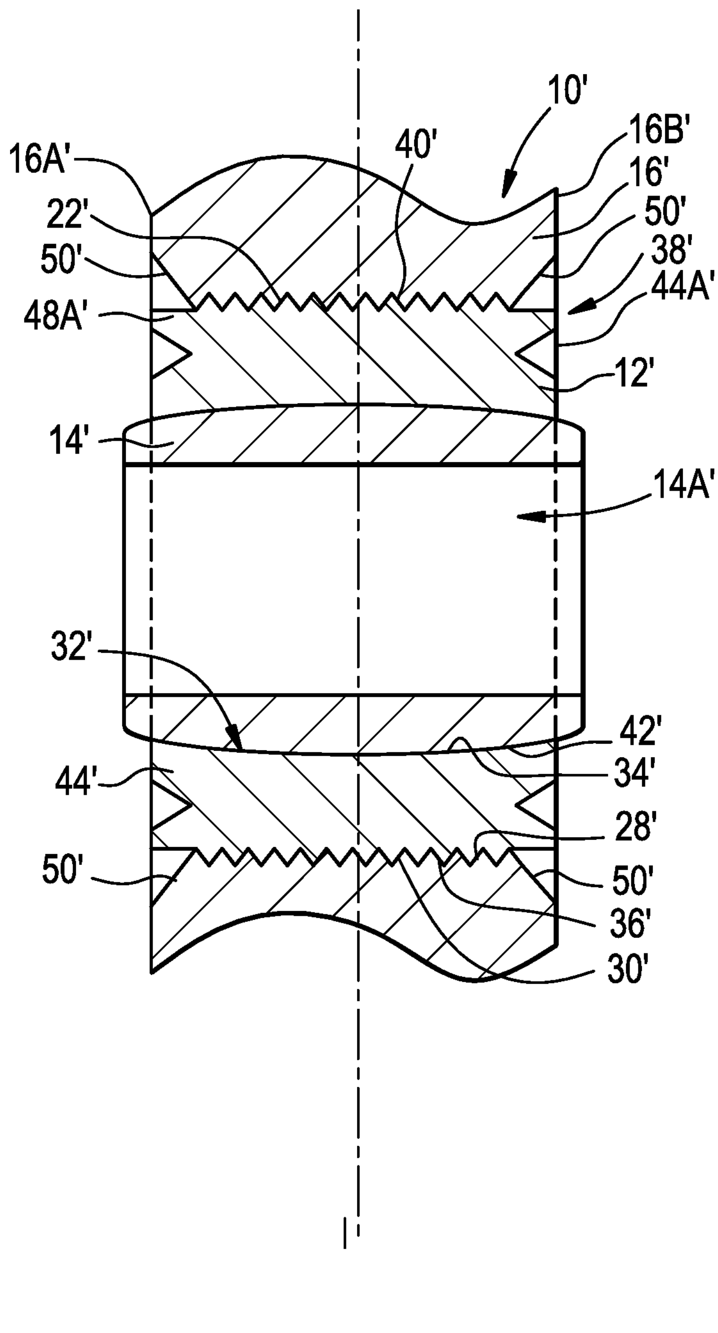
FIG. 13 is a longitudinal cross section of an alternative embodiment of the spherical bearing assembly of the present invention, wherein a female threaded surface is formed in the housing.

In the embodiment is shown in FIG. 13, corresponding elements are labeled as such, but are denoted as prime. In this embodiment, a housing 16' has a bore 38' extending therethrough. The bore 38' is defined by a fourth inner surface 22' of the housing 16'. The fourth inner surface 22' of the housing 16' has a first fastener mechanism 28' (e.g., a female threaded area) formed therein. A bearing is disposed in the bore 38'. The bearing includes an inner member 14' disposed in an outer ring 12'. The outer ring 12' defines a second exterior surface 30'. A second interior area 32' defines a second inner surface 34' (e.g., a spherical surface) that extends along the outer ring 12'. A second fastener mechanism 36' (e.g., a male thread) is formed in the second exterior surface 30'. The outer ring 12' is removably disposed in the bore 38' defined by the fourth inner surface 22' via selective engagement of the first fastener mechanism 28' (e.g., a female thread) with the second fastener mechanism 36' (e.g., a male thread). In one embodiment, as shown in FIG. 13, the first fastener mechanism 28' is a female threaded area and the second fastener mechanism 36' is a male threaded area. The male threaded area 36' is selectively engaged in the female threaded area 28'.

In one embodiment, the outer sleeve 18 is manufactured form a first metallic material and the inner sleeve 20 is manufactured a second metallic material, the second metallic material being different than the first metallic material. In one embodiment, the outer sleeve 18 and the inner sleeve 20 are manufactured from one or more of metallic materials, non-metallic materials, composite materials, coated materials, plastics, materials having treated surfaces, materials having untreated surfaces or any metallic or nonmetallic materials, with or without one or more treatments. The materials are selected to inhibit galvanic corrosion. In one embodiment, the inner sleeve 20 and/or the outer sleeve 18 has a surface treatment thereon.

A method for assembling a bearing 10 in a housing 16 includes providing the housing 16. The housing 16 has a bore 38 that extends therethrough. The bore 38 is defined by the fourth interior surface 40. The method further includes providing the bearing 10. The bearing 10 includes the outer ring 12, which includes the outer sleeve 18 and the inner sleeve 20. The outer sleeve 18 defines the first exterior surface 22 and the first interior area 24. The first interior area 24 is defined by the first inner surface 26. The first inner surface 26 has the first fastener mechanism 28 formed therein (e.g., a female thread). The inner sleeve 20 defines the second exterior surface 30 and the second interior area 32. The second interior area 32 is defined by the second inner surface 34 that extends along the outer sleeve 18. The second exterior surface 30 has the second fastener mechanism 36 (e.g., a male thread) formed therein.

The bearing further includes the inner member 14. The inner member 14 has the third exterior surface 42 (e.g., a convex spherical surface) formed thereon. The inner member 14 is moveably disposed in the second interior area 32 for relative motion between the inner member 14 and the outer ring 12. The relative motion is caused by an operating torque applied to the inner member and/or the outer ring. The method further includes press fitting the outer sleeve 18 in the bore 38 of the housing 16 and removably disposing the inner sleeve 20 in the first interior area 24. The inner sleeve 20 is removably disposed in the first interior area 24 by selectively engaging the second fastener mechanism 36 with the first fastener mechanism 28, such that the operating torque applied to the inner member and/or the outer ring is remains within a predetermined range throughout the selective engagement of the first fastener mechanism 28 with the second fastener mechanism 36 and after press fitting the outer sleeve 18 in the bore 38.

Although the present invention has been disclosed and described with reference to certain embodiments thereof, it should be noted that other variations and modifications may be made, and it is intended that the following claims cover the variations and modifications within the true scope of the invention.

What is claimed is:

1. A bearing and housing assembly, the assembly comprising:

a housing having a bore extending therethrough, the bore being defined by a housing inner surface, the housing inner surface having a first fastener mechanism formed therein, extending axially and circumferentially substantially along an entirety of the inner surface, wherein the housing inner surface is an uninterrupted surface;

a bearing disposed at least partially in the bore, the bearing comprising:

an outer ring defining a first exterior surface and a first interior area, the first interior area being defined by a first inner surface extending along the outer ring, the first exterior surface being cylindrical and having a second fastener mechanism formed therein, extending axially from a first axial end to a second axial end of the outer ring and extending circumferentially substantially along an entirety of the first exterior surface; and the outer ring being removably disposed in the housing by selective engagement of the first fastener mechanism with the second fastener mechanism; and an inner member, the inner member being disposed in the first interior area of the outer ring for relative rotation therebetween, the relative rotation being caused by an operating torque, wherein the first fastener mechanism comprises a female threaded area extending axially from the first axial end to the second axial end of the outer ring and the second fastener mechanism comprises a male threaded area which is selectively threadedly engaged with the female threaded area, wherein the female threaded area and the male threaded area cooperate with one another to establish an operating torque range control feature comprising a clearance between the male threaded area and the female threaded area, the clearance between the male threaded area and the female threaded area being configured to accommodate radially inward distortion of the outer ring so that torque is maintained within a predetermined range of 5% of the operating torque.

2. The bearing and housing assembly of claim 1, wherein the first inner surface has a major diameter and the female threaded area is defined by a tap drill that is 83-93% of the major diameter.

3. An outer ring for a bearing comprising:

an outer sleeve defining a first exterior surface and a first interior area, the first interior area being defined by a first inner surface extending along the outer sleeve, the first inner surface having a first fastener mechanism formed therein, extending axially from a first axial end to a second axial end of the outer sleeve and extending circumferentially substantially along an entirety of the first inner surface, wherein the first inner surface is an uninterrupted surface;

an inner sleeve defining a second exterior surface and a second interior area, the second interior area being defined by a second inner surface extending along the inner sleeve, the second exterior surface having a second fastener mechanism formed therein, extending axially from a third axial end to a fourth axial end of the inner sleeve and extending circumferentially substantially along an entirety of the second exterior surface;

the inner sleeve being removably disposed in the first interior area by selective engagement of the first fastener mechanism with the second fastener mechanism and so that the outer sleeve surrounds the inner sleeve; and wherein the first fastener mechanism comprises a female threaded area extending axially from the first axial end to the second axial end of the outer sleeve and the second fastener mechanism comprises a male threaded area which is selectively threadedly engaged with the female threaded area, wherein the outer ring is configured for installation in a bearing having an inner member, the inner member having a third exterior surface, the inner member being at least partially disposed in the first interior area for relative rotation therebetween, the relative rotation being caused by an operating torque, further wherein the first exterior surface is cylindrical and has an outside diameter of a magnitude configured to be press fit into a bore of a housing, wherein the female threaded area and the male threaded area cooperate with one another to establish an operating torque range control feature comprising a clearance between the male threaded area and the female threaded area, the clearance between the male threaded area and the female threaded area being configured to accommodate radially inward distortion of the outer ring so that torque is maintained within a predetermined range of 5% of the operating torque.

4. The outer ring of claim 3, wherein the second inner surface defines a bearing surface for rotatable communication with a third exterior surface of the inner member.

5. The outer ring of claim 4, wherein the inner member is one of an inner race, a ball, a shaft, a pin and another sliding or rolling member.

6. The outer ring of claim 3, wherein the outer sleeve defines at least one locking mechanism for preventing rotation of the outer sleeve relative to the inner sleeve when the inner sleeve is disposed in the first interior area.

7. The outer ring of claim 6, wherein the at least one locking mechanism comprises at least one staking groove formed in at least one axial end of the outer sleeve, the at least one staking groove defining at least one axially extending leg.

8. The outer ring of claim 7, wherein the inner sleeve defines at least one chamfer for receiving one of the at least one axially extending legs.

9. The outer ring of claim 3, wherein the outer sleeve is manufactured from a first metallic material and the inner sleeve is manufactured from a second metallic material different than the first metallic material, the first metallic material and the second metallic material being selected to inhibit galvanic corrosion.

10. The outer ring of claim 3, wherein the bearing is one of a spherical bearing, a journal bearing and a roller bearing.

11. The outer ring of claim 3, wherein the first inner surface has a major diameter and the female threaded area has a size defined by a tap drill that is 83-93% of the major diameter.

12. A bearing assembly comprising:

an outer ring comprising:

an outer sleeve defining a first exterior surface and a first interior area, the first interior area being defined by a first inner surface extending along the outer sleeve, the first inner surface having a first fastener mechanism formed therein, extending axially from a first axial end to a second axial end of the outer sleeve and extending circumferentially substantially along an entirety of the first inner surface, wherein the first inner surface is an uninterrupted surface;

an inner sleeve defining a second exterior surface and a second interior area, the second interior area being defined by a second inner surface extending along the inner sleeve, the second exterior surface having a second fastener mechanism formed therein, extending axially and circumferentially substantially along an entirety of the second exterior surface from a third axial end to a fourth axial end of the inner sleeve;

the inner sleeve being removably disposed in the first interior area by selective engagement of the first fastener mechanism with the second fastener mechanism and so that the outer sleeve surrounds the inner sleeve; and wherein the first fastener mechanism comprises a female threaded area extending axially from the first axial end to the second axial end of the outer sleeve and the second fastener mechanism comprises a male threaded area which is selectively threadedly engaged with the female threaded area; and an inner member having a third exterior surface, the inner member being at least partially disposed in the first interior area for relative rotation therebetween, the relative rotation being caused by an operating torque, wherein the first exterior surface is cylindrical and has an outside diameter of a magnitude configured to be press fit into a bore of a housing, wherein the female threaded area and the male threaded area cooperate with one another to establish an operating torque range control feature comprising a clearance between the male threaded area and the female threaded area, the clearance between the male threaded area and the female threaded area being configured to accommodate radially inward distortion of the outer ring so that torque is maintained within a predetermined range of 5% of the operating torque.

13. The bearing assembly of claim 12, wherein the outer sleeve defines at least one locking mechanism for preventing rotation of the outer sleeve relative to the inner sleeve when the inner sleeve is disposed in the in the first interior area.

14. The bearing assembly of claim 13, wherein the at least one locking mechanism comprises at least one staking groove formed in at least one axial end of the outer sleeve, the at least one staking groove defining at least one axially extending leg.

15. The bearing assembly of claim 13, wherein the inner sleeve defines at least one chamfer for receiving one of the at least one axially extending legs.

16. The bearing assembly of claim 12, wherein the outer sleeve is manufactured from a first metallic material and the inner sleeve is manufactured from a second metallic material different than the first metallic material, the first metallic material and the second metallic material being selected to inhibit galvanic corrosion.

17. The bearing assembly of claim 12, wherein the bearing is one of a spherical bearing, a journal bearing and a roller bearing.

18. The bearing assembly of claim 12, wherein the inner member is one of an inner race, a ball, a shaft, a pin and another sliding or rolling member.

19. The bearing assembly of claim 12, wherein the first inner surface has a major diameter and the female threaded area has a size defined by a tap drill that is 83-93% of the major diameter.

20. A bearing and housing assembly, the assembly comprising:

a housing having a bore extending therethrough, the bore being defined by a fourth inner surface of the housing;

a bearing disposed at least partially in the bore, the bearing comprising:

an outer ring comprising:

an outer sleeve defining a first exterior surface and a first interior area, the first interior area being defined by a first inner surface extending along the outer sleeve, the first inner surface having a first fastener mechanism formed therein, extending axially from a first axial end to a second axial end of the outer sleeve and extending circumferentially substantially along an entirety of the first inner surface, wherein the first inner surface is an uninterrupted surface;

an inner sleeve defining a second exterior surface and a second interior area, the second interior area being defined by a second inner surface extending along the inner sleeve, the second exterior surface having a second fastener mechanism formed therein, extending axially from a third axial end to a fourth axial end of the inner sleeve and extending circumferentially substantially along an entirety of the second exterior surface;

the inner sleeve being removably disposed in the first interior area by selective engagement of the first fastener mechanism with the second fastener mechanism and so that the outer sleeve surrounds the inner sleeve; and wherein the first fastener mechanism comprises a female threaded area extending axially from the first axial end to the second axial end of the outer sleeve and the second fastener mechanism comprises a male threaded area which is selectively threadedly engaged with the female threaded area; and an inner member having a third exterior surface, the inner member being disposed in the first interior area of the outer ring for relative rotation therebetween, the relative rotation being caused by an operating torque, wherein the first exterior surface is cylindrical and has an outside diameter of a magnitude configured to be press fit into the bore of the housing, wherein the female threaded area and the male threaded area cooperate with one another to establish an operating torque range control feature comprising a clearance between the male threaded area and the female threaded area, the clearance between the male threaded area and the female threaded area being configured to accommodate radially inward distortion of the outer ring so that torque is maintained within a predetermined range of 5% of the operating torque.

21. The bearing and housing assembly of claim 20, wherein the outer sleeve defines at least one locking mechanism for preventing rotation of the outer sleeve relative to at least one of the inner sleeve and the housing.

22. The bearing and housing assembly of claim 21, wherein the at least one locking mechanism comprises at least one staking groove formed in at least one axial end of the outer sleeve, the at least one staking groove defining at least one axially extending leg.

23. The bearing and housing assembly of claim 22, wherein at least one of the inner sleeve and the housing defines at least one chamfer for receiving one of the at least one axially extending legs.

24. The bearing and housing assembly of claim 20, wherein the outer sleeve is manufactured from a first metallic material and the inner sleeve is manufactured from a second metallic material different than the first metallic material, the first metallic material and the second metallic material being selected to inhibit galvanic corrosion.

25. The bearing and housing assembly of claim 20, wherein first exterior surface of the outer sleeve has a first diameter that is selectively determined for achieving the press fit.

26. The bearing and housing assembly of claim 20, wherein the bearing is one of a spherical bearing, a roller bearing and a journal bearing.

27. The bearing and housing assembly of claim 20, wherein the inner member is one of an inner race, a ball, a shaft, a pin and another sliding or rolling member.

28. The bearing and housing assembly of claim 20, wherein the first inner surface has a major diameter and the female threaded area is defined by a tap drill that is 83-93% of the major diameter.

29. A method for assembling a bearing in a housing, the method comprising:

providing a housing having a bore extending therethrough, the bore being defined by a fourth inner surface of the housing;

providing a bearing comprising:

an outer ring comprising;

an outer sleeve defining a first exterior surface and a first interior area, the first exterior surface being cylindrical and the first interior area being defined by a first inner surface extending along the outer sleeve, the first inner surface having a first fastener mechanism formed therein, extending axially from a first axial end to a second axial end of the outer ring and extending circumferentially substantially along an entirety of the first inner surface, the first fastener mechanism comprising a female threaded area extending axially from the first axial end to the second axial end of the outer ring, wherein the first inner surface is an uninterrupted surface;

an inner sleeve defining a second exterior surface and a second interior area, the second interior area being defined by a second inner surface extending along the inner sleeve, the second exterior surface having a second fastener mechanism formed therein, extending axially from a third axial end to a fourth axial end of the inner sleeve and extending circumferentially substantially along an entirety of the second exterior surface, wherein the second fastener mechanism comprises a male threaded area which is selectively threadedly engaged with the female threaded area; wherein the female threaded area and the male threaded area have a thread clearance of a magnitude sufficient to compensate for radial inward distortion of the outer sleeve;

the inner sleeve being removably disposed in the first interior area by selective engagement of the first fastener mechanism with the second fastener mechanism and so that the outer sleeve surrounds the inner sleeve; and an inner member having a third exterior surface, the inner member being moveably disposed in the second interior area for relative motion between the inner member and the outer ring, the relative motion being caused by an operating torque;

press fitting the outer sleeve in the bore of the housing; and removably disposing the inner sleeve in the first interior area by selectively engaging the second fastener mechanism with the first fastener mechanism;

wherein the female threaded area and the male threaded area cooperate with one another to establish an operating torque range control feature comprising a clearance between the male threaded area and the female threaded area, the clearance between the male threaded area and the female threaded area being configured to accommodate radially inward distortion of the outer ring so that torque is maintained within a predetermined range of 5% of the operating torque.

30. The method according to claim 29, wherein the outer sleeve maintains a pre-selective engagement conformation upon selective engagement of the first fastener mechanism with the second fastener mechanism.

31. The method for assembling a bearing housing of claim 29, wherein the first inner surface has a major diameter and the female threaded area is defined by a tap drill that is 83-93% of the major diameter.

* * * * *